US012658460B2

(12) United States Patent
Dong et al.

(10) Patent No.: US 12,658,460 B2
(45) Date of Patent: Jun. 16, 2026

(54) PERFORMANCE TESTING DEVICE APPLICABLE TO METAL FUEL CELL

(71) Applicant: Beijing Institute of Technology, Beijing (CN)

(72) Inventors: Mingming Dong, Beijing (CN); Weipeng Liu, Beijing (CN); Yu Zhang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 821 days.

(21) Appl. No.: 17/987,150

(22) Filed: Nov. 15, 2022

(65) Prior Publication Data

US 2024/0113315 A1 Apr. 4, 2024

(30) Foreign Application Priority Data

Sep. 16, 2022 (CN) .......................... 202211129846.6

(51) Int. Cl.
*H01M 8/04664* (2016.01)
*H01M 8/04537* (2016.01)

(52) U.S. Cl.
CPC ... *H01M 8/04671* (2013.01); *H01M 8/04611* (2013.01)

(58) Field of Classification Search
CPC ......... H01M 8/04671; H01M 8/04611; H01M 10/4228; H01M 10/0404; Y02E 60/50; G01R 31/3644
See application file for complete search history.

(56) References Cited

U.S. PATENT DOCUMENTS

2010/0291451 A1* 11/2010 Tamura ............. H01M 8/04228
429/429

FOREIGN PATENT DOCUMENTS

| CN | 2505849 | Y | 8/2002 | |
|---|---|---|---|---|
| CN | 107210503 | A | 9/2017 | |
| CN | 108844989 | A | 11/2018 | |
| CN | 110021772 | A * | 7/2019 | .......... H01M 8/2404 |
| CN | 110146821 | A | 8/2019 | |
| CN | 111323721 | A | 6/2020 | |
| CN | 111537900 | A | 8/2020 | |
| CN | 113523268 | A | 10/2021 | |
| CN | 113555627 | A | 10/2021 | |

(Continued)

*Primary Examiner* — Christopher E Mahoney
(74) *Attorney, Agent, or Firm* — Whiteford, Preston & Taylor, LLP; Peter J. Davis

(57) ABSTRACT

The present disclosure relates to a performance testing device applicable to a metal fuel cell, and belongs to the field of metal fuel cells. Self-adaptive clamping equipment can be used for autonomously positioning and clamping galvanic piles with different sizes and shapes, and can be self-adaptively fixed according to the shapes. Sealing performance testing equipment is used for testing the sealing performance of the metal fuel cell through a testing pool. Discharge performance testing equipment is used for testing the discharge performance of the metal fuel cell. According to the performance testing device, two performances of sealing and discharging can be tested at the same time, perfusion of different electrolytes and measurement of galvanic piles composed of different numbers of single cells with different sizes can be realized, and the compatibility requirement of large-batch and multi-type cells delivered from a factory is met.

10 Claims, 2 Drawing Sheets

(56)         References Cited

FOREIGN PATENT DOCUMENTS

| | | | | |
|---|---|---|---|---|
| CN | 113764715 | A | 12/2021 | |
| CN | 216054915 | U | 3/2022 | |
| CN | 216213720 | U | 4/2022 | |
| KR | 20210079453 | A * | 6/2021 | .............. G01M 3/20 |

* cited by examiner

PERFORMANCE TESTING DEVICE APPLICABLE TO METAL FUEL CELL

CROSS-REFERENCE TO RELATED APPLICATION

This patent application claims the benefit and priority of Chinese Patent Application No. 202211129846.6, filed with the China National Intellectual Property Administration on Sep. 16, 2022, the disclosure of which is incorporated by reference herein in its entirety as part of the present application.

TECHNICAL FIELD

The present disclosure relates to the field of metal fuel cells, in particular to a performance testing device applicable to a metal fuel cell.

BACKGROUND

The metal fuel cell has the advantages of low cost, no toxicity, no pollution, stable discharge voltage, high specific energy, high specific power and the like, and is rich in resources. The metal fuel cell can be recycled, and is a new energy with great development and application prospects. In recent years, along with the development and perfection of some theoretical processes, the metal fuel cell is widely produced and applied in the fields of electric vehicles, national defense industry, traffic equipment and the like, and has great development potentials in some emerging energy industries. However, test standards and equipment related to the production link of metal fuel cell products have not been fully developed into a complete ecological chain. At present, specifically clear standards and definitions of the indexes of core performances, such as sealing performance and discharge performance, of various metal fuel cells in the industry are lacking. A performance testing instrument which can be applicable to examination and testing of various metal fuel cell products when the metal fuel cell products leave the factory is lacking in the aspect of performance testing devices. Due to the deficiency and insufficiency of detection indexes and testing equipment, the metal fuel cell lacks enough attraction in the links of market application, industrial selection and the like, and the competitiveness of other types of cell industries is difficult to reach.

In the prior art, the metal fuel cell has the following disadvantages.

Firstly, the researches and the patents of the metal fuel cell are mostly focused on the theoretical design structure of the cell (such as CN202122267399.8 and CN202122753280.1), the interaction technology with external heat transfer and vibration transfer (such as CN202010325788.9 and CN202111141482.9) and the application aspect of novel materials (such as CN202110592807.9 and CN201580066255.0). The subsequent steps of product production such as performance tests are neglected. The performance tests lack standard index support, so that the metal fuel cell is difficult to put into the market for production and use.

Secondly, in the aspect of performance testing of the metal fuel cell, durability performance testing (such as CN202010263777.2 and CN201910447903.7) and cell temperature maintaining performance testing (such as CN201810958448.2) are mainly carried out in the prior art. Test standards in a definite sense are lacking for the testing of the two core performances, namely sealing performance and discharge performance, of the metal fuel cell. The prior art and the current standard cannot meet the core performance test requirement of the metal fuel cell when the metal fuel cell leaves the factory.

Thirdly, there is a lack of hardware relation (such as CN201811527075.X and CN01254481.7) between clamping equipment used for testing the cell performance and a performance testing device. The clamping equipment does not consider geometric shape differences among different metal fuel cells, different cell connection modes and even different numbers of single cells with different sizes, and also does not consider the connection of an electrical circuit and the external circulation of an electrolyte pipeline, so that the performance test of a product is blocked by the clamping device to a certain extent. Therefore, the geometric shape of a galvanic pile, the connection of the circuit and the pipeline and the test requirement of the cell are comprehensively considered in multiple aspects, and the clamping equipment and the performance testing device are organically integrated, so that the performance testing requirement of the metal fuel cell is met.

Fourthly, the relation between different test standards of the metal fuel cell is artificially split, so that the testing link is objectively not consistent, internal factors of different tests of a certain metal fuel cell are influenced mutually, and the timeliness of the performance test of the galvanic pile is difficult to meet the requirement.

SUMMARY

The present disclosure aims to provide a performance testing device applicable to a metal fuel cell so as to meet the compatibility requirement of large-batch and multi-type cells delivered from a factory and synchronously carry out a sealing test and a discharging test.

In order to achieve the purpose, the present disclosure provides the following scheme.

Disclosed is a performance testing device applicable to a metal fuel cell. The performance testing device comprises self-adaptive clamping equipment, a lifting console, a testing pool, sealing performance testing equipment and discharge performance testing equipment, wherein the self-adaptive clamping equipment is arranged in the testing pool; the self-adaptive clamping equipment is used for autonomously positioning and clamping galvanic piles with different sizes and shapes;

the lifting console is connected with the self-adaptive clamping equipment, and the lifting console is used for controlling the self-adaptive clamping equipment to ascend and descend and regulating and controlling the height from the self-adaptive clamping equipment to the bottom of the testing pool;

the sealing performance testing equipment is connected with the testing pool and used for testing the sealing performance of the metal fuel cell through the testing pool; and the discharge performance testing equipment is connected with the metal fuel cell in the self-adaptive clamping equipment and used for testing the discharge performance of the metal fuel cell.

Optionally, the self-adaptive clamping equipment comprises a supporting table, two display boards, four clamping structures and four lifting rings;

the two display boards are both in comb shapes, the two opposite sides of the supporting table are in comb shapes matched with the display boards, and each display board is telescopically connected with one side of the supporting table; when the two display boards are not unfolded, the two display boards and the supporting platform form a complete flat board; the two display boards are unfolded at corresponding lengths according to the size of a galvanic pile, and gaps between combs of the display boards are used for enabling an electrolyte leaked from the galvanic pile to flow down and be collected in the testing pool;

the two clamping structures are oppositely arranged on the two display boards, the other two clamping structures are oppositely arranged on the supporting table, and the connecting line of the two clamping structures is vertical to the connecting line of the other two clamping structures; the four clamping structures are used for autonomously positioning and clamping galvanic piles with different sizes and shapes;

the four lifting rings are fixedly connected with the supporting table, and the control ends of the four lifting rings are connected with the lifting console; and the four lifting rings are used for driving the supporting table and the galvanic pile to ascend and descend under the control of the lifting console and regulating and controlling the height from the galvanic pile to the bottom of the testing pool.

Optionally, the clamping structures comprise a height adjustment supporting rod, a height locking device, a clamping supporting rod, a spherical hinge connecting device and a self-adaptive claw plate;

one end of the height adjustment supporting rod is connected with the height locking device, and the other end of the height adjustment supporting rod is vertically connected with one end of the clamping supporting rod; the height locking device is fixed on the display boards or the supporting table; the other end of the clamping supporting rod is connected with the self-adaptive claw plate through the spherical hinge connecting device; the self-adaptive claw plate can rotate by 120° around the spherical hinge connecting device;

the height adjustment supporting rod is used for adjusting the vertical height, so that the axis of the clamping supporting rod coincides with the axis of the galvanic pile and is fixed through the height locking device; and the clamping supporting rod is used for adjusting the horizontal elongation degree, and the galvanic pile is clamped through the self-adaptive claw plate.

Optionally, the self-adaptive claw plate comprises a three-way rod and a connecting flat plate; and one end of the three-way rod is connected with the same side face of the connecting flat plate, and the other end of the three-way rod is connected with the spherical hinge connecting device.

Optionally, the performance testing device further comprises four lifting columns;

one end of each of the four lifting columns is fixedly connected with the bottom of the testing pool; the four lifting columns penetrate through the four lifting rings in a one-to-one correspondence mode; and the self-adaptive clamping equipment moves up and down along the lifting columns.

Optionally, the sealing performance testing equipment comprises a distilled water tank, a distilled water pipe, a water pump, an electronic scale and a water leakage detection instrument;

the distilled water tank is connected with the testing pool through the distilled water pipe, and the water pump is arranged on the distilled water pipe; the distilled water tank is used for providing distilled water required by a sealing performance test permeation experiment for the testing pool through the distilled water pipe and the water pump;

the electronic scale is arranged below the testing pool and used for measuring the mass of the galvanic pile before and after reaction operation in a sealing performance test leakage experiment, so that the water leakage amount of the galvanic pile is obtained; and the water leakage detection instrument is placed at the bottom of the testing pool during the sealing performance test leakage experiment to detect whether a leakage phenomenon of the galvanic pile exists or not.

Optionally, the calculation formula of the water leakage amount of the galvanic pile is shown as follows:

$$V_t = \frac{V_l}{T_1} = \frac{m_l}{\rho_s} \cdot \frac{1}{T_1} = \frac{m_0 - m_1}{\rho_s} \cdot \frac{1}{T_1}; \text{ and}$$

in the formula, $V_t$ is the leakage amount during the operation of the galvanic pile in unit time, $V_l$ is the volume of leaked liquid in the duration of $T_1$, $m_l$ is the mass of leaked liquid during operation in the duration of $T_1$, $\rho_s$ is the density of the leaked liquid, $m_0$ is the initial mass at the beginning of measurement during stable operation of the galvanic pile, and $m_1$ is the mass at the end of measurement.

Optionally, the performance testing device further comprises a test platform;

the test platform is divided into three layers including a top layer, a middle layer and a bottom layer; the top layer is used for placing the electronic scale; the middle layer is used for placing the distilled water tank; and the bottom layer is used for placing an electrolyte circulating system and accessory equipment of the metal fuel cell.

Optionally, the discharge performance testing equipment comprises electric test equipment, a data acquisition instrument and a computer;

cathode and anode binding posts of the galvanic pile are connected to the anode and the cathode of the electric test equipment;

the signal output end of the electric test equipment is connected with the signal input end of the data acquisition instrument, and the signal output end of the data acquisition instrument is connected with the computer;

the electric test equipment is used for acquiring electric parameter data of the galvanic pile and transmitting the electric parameter data to the data acquisition instrument;

the data acquisition instrument is used for forming a time domain data set file from the acquired electric parameter data and transmitting the time domain data set file to the computer; and the computer is used for analyzing and calculating the electric parameter data in the time domain data set file to complete a discharge performance test.

Optionally, the test indexes of discharge performance evaluation comprise average stable operation power $W_e$ and maximum power difference $W_\Delta$;

the calculation formula of the average stable operation power $$W_e \text{ is } W_e = \frac{\sum w_t}{T_2};$$

5

6 in the formula, $W_t$ is the real-time power of the galvanic pile, and $T_2$ is the stable operation testing duration of the galvanic pile;

the calculation formula of the maximum power difference $W_\Delta$ is $W_\Delta = |W_e - (W_t)_{max}|$; and in the formula, $(W_t)_{max}$ is the maximum value of the real-time power of the galvanic pile.

According to specific embodiments provided by the present disclosure, the present disclosure has the following technical effects.

The present disclosure relates to a performance testing device applicable to a metal fuel cell. Self-adaptive clamping equipment can be used for autonomously positioning and clamping galvanic piles with different sizes and shapes, and can be self-adaptively fixed according to the shapes. Sealing performance testing equipment is used for testing the sealing performance of the metal fuel cell through a testing pool. Discharge performance testing equipment is used for testing the discharge performance of the metal fuel cell. According to the performance testing device, two performances of sealing and discharging can be tested at the same time, perfusion of different electrolytes and measurement of galvanic piles composed of different numbers of single cells with different sizes can be realized, and the compatibility requirement of large-batch and multi-type cells delivered from a factory is met.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

Figures 1, 2:
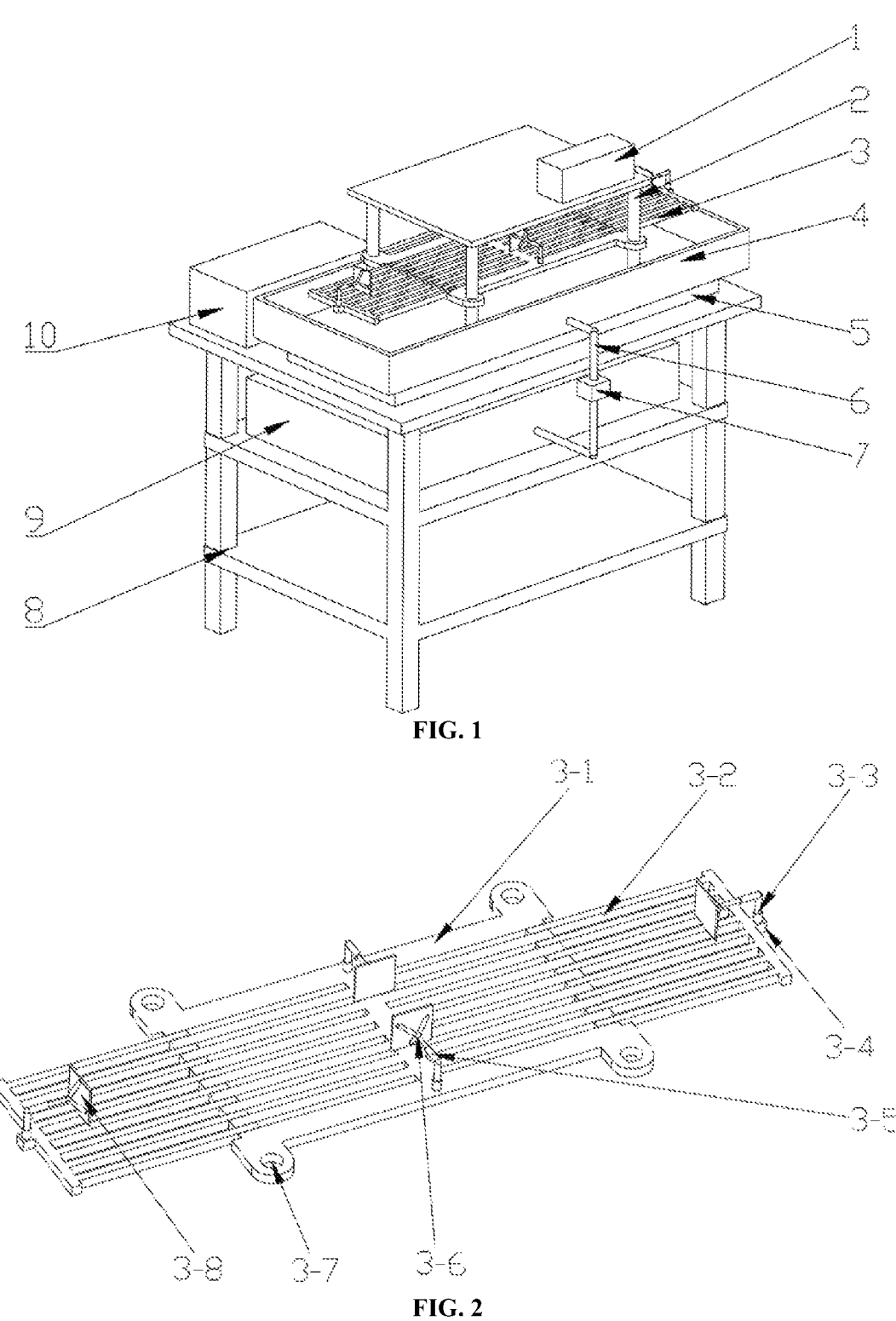
FIG. 1 is a structural schematic diagram of a performance testing device applicable to a metal fuel cell provided by the embodiment of the present disclosure.
FIG. 2 is a structural schematic diagram of self-adaptive clamping equipment provided by the embodiment of the present disclosure.

Reference signs: 1, lifting console; 2, lifting column; 3, self-adaptive clamping equipment; 3-1, supporting table; 3-2, display board; 3-3, height adjustment supporting rod; 3-4, height locking device; 3-5, clamping supporting rod; 3-6, spherical hinge connecting device; 3-7, lifting ring; 3-8, self-adaptive claw plate; 4, testing pool; 5, electronic scale; 6, distilled water pipe; 7, water pump; 8, test platform; 9, distilled water tank; 10, electric test equipment; 11, data acquisition instrument; 12, computer; and 13, galvanic pile.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a performance testing device applicable to a metal fuel cell so as to meet the compatibility requirement of large-batch and multi-type cells delivered from a factory and synchronously carry out a sealing test and a discharging test.

To make the foregoing objective, features and advantages of the present disclosure clearer and more comprehensible, the present disclosure is further described in detail below with reference to the attached figures and specific embodiments.

The metal fuel cell is also called as a metal-air cell, and is a special fuel cell which takes metal as fuel and generates an oxidation-reduction reaction with oxygen in air to generate electric energy. The metal fuel cell is structurally composed of a metal anode, an electrolyte and an air cathode. Taking active solid metal (such as aluminum, zinc, lithium, magnesium and the like) with negative electrode potential as a fuel source, an alkaline solution or a neutral salt solution as the electrolyte, and oxygen in air as the cathode, the metal fuel cell has the advantages of low cost, no toxicity, no pollution, stable discharge voltage, high specific energy, high specific power and the like.

The sealing performance and the discharge performance are two important core performance indexes of the metal fuel cell, and the sealing performance ensures that a qualified cell product reaches certain leakage-proof standards: firstly, an electrolyte solution cannot leak out of the cell; and secondly, water cannot leak into the cell, so that a sealing performance test is a standard test for examining the sealing performance of the metal fuel cell. The discharge performance is an index of the change of electric parameters such as internal resistance, open-circuit voltage and discharge power of the cell under stable working conditions of the cell and the change of temperature in the discharge process, and the discharge performance test is a standard test for examining the discharge performance of the metal fuel cell.

The tests of the two core performance indexes, such as the sealing performance and the discharge performance, of the metal fuel cell are innovatively and organically combined together, the performance testing device applicable to a metal fuel cell is designed, and clear performance testing indexes re defined for factory inspection of the metal fuel cell in cooperation with the device. As shown in FIG. 1, the performance testing device applicable to a metal fuel cell provided by the embodiment of the present disclosure comprises self-adaptive clamping equipment 3, a lifting console 1, a testing pool 4, sealing performance testing equipment and discharge performance testing equipment. The self-adaptive clamping equipment 3 is arranged in the testing pool 4; and the self-adaptive clamping equipment 3 is used for autonomously positioning and clamping galvanic piles 13 with different sizes and shapes, and can be self-adaptively fixed according to the shapes. The lifting console 1 is connected with the self-adaptive clamping equipment 3, and the lifting console 1 is used for controlling the self-adaptive clamping equipment 3 to ascend and descend and regulating and controlling the height from the self-adaptive clamping equipment 3 to the bottom of the testing pool 4. The sealing performance testing equipment is connected with the testing pool 4 and used for testing the sealing performance of the metal fuel cell through the testing pool 4. The discharge performance testing equipment is connected with the metal fuel cell in the self-adaptive clamping equipment 3 and used for testing the discharge performance of the metal fuel cell. Wherein, the galvanic pile 13 is a whole body of a plurality of cells formed by connecting a plurality of metal fuel single cells through a series or parallel electrical structure, and channels are arranged among the single cells and are used for exchanging the electrolyte. The electrolyte is a certain corrosive medium used in a chemical cell, and provides ions for normal operation of the metal fuel cell.

The performance testing device can be used for self-adaptively clamping various metal fuel cells and galvanic piles 13. Two performances of sealing and discharging can be tested at the same time, perfusion of different electrolytes and measurement of galvanic piles composed of different numbers of single cells with different sizes can be realized, and the compatibility requirement of large-batch and multi-type cells delivered from a factory is met.

The specific structure of the performance testing device is described in further detail below with reference to the attached figures.

Referring to FIG. 2, the self-adaptive clamping equipment 3 comprises a supporting table 3-1, two display boards 3-2, four clamping structures and four lifting rings 3-7. The two display boards 3-2 are both in comb shapes, the two opposite sides of the supporting table 3-1 are in comb shapes matched with the display boards 3-2, and each display board 3-2 is telescopically connected with one side of the supporting table 3-1; when the two display boards 3-2 are not unfolded, the two display boards 3-2 and the supporting platform 3-1 form a complete flat board; and the two display boards 3-2 are unfolded at corresponding lengths according to the size of a galvanic pile 13, and gaps between combs of the display boards 3-2 are used for enabling an electrolyte leaked from the galvanic pile 13 to flow down and be collected in the testing pool 4. The two clamping structures are oppositely arranged on the two display boards 3-2, the other two clamping structures are oppositely arranged on the supporting table 3-1, and the connecting line of the two clamping structures is vertical to the connecting line of the other two clamping structures; and the four clamping structures are used for autonomously positioning and clamping galvanic piles 13 with different sizes and shapes. The four lifting rings 3-7 are fixedly connected with the supporting table 3-1, and the control ends of the four lifting rings 3-7 are connected with the lifting console 1; and the four lifting rings 3-7 are used for driving the supporting table 3-1 and the galvanic pile 13 to ascend and descend under the control of the lifting console 1 and regulating and controlling the height from the galvanic pile 13 to the bottom of the testing pool 4.

The clamping structures comprise a height adjustment supporting rod 3-3, a height locking device 3-4, a clamping supporting rod 3-5, a spherical hinge connecting device 3-6 and a self-adaptive claw plate 3-8. One end of the height adjustment supporting rod 3-3 is connected with the height locking device 3-4, and the other end of the height adjustment supporting rod 3-3 is vertically connected with one end of the clamping supporting rod 3-5; the height locking device 3-5 is fixed on the display boards 3-2 or the supporting table 3-1; the other end of the clamping supporting rod 3-5 is connected with the self-adaptive claw plate 3-8 through the spherical hinge connecting device 3-6; and the self-adaptive claw plate 3-8 can rotate by 120° around the spherical hinge connecting device 3-6. The height adjustment supporting rod 3-3 is used for adjusting the vertical height, so that the axis of the clamping supporting rod 3-5 coincides with the axis of the galvanic pile 13 and is fixed through the height locking device 3-4. The clamping supporting rod 3-5 is used for adjusting the horizontal elongation degree, and the galvanic pile 13 is clamped through the self-adaptive claw plate 3-8.

The self-adaptive claw plate 3-8 comprises a three-way rod and a connecting flat plate. One end of the three-way rod is connected with the same side face of the connecting flat plate, and the other end of the three-way rod is connected with the spherical hinge connecting device 3-6.

The performance testing device further comprises four lifting columns 2. One end of each of the four lifting columns 2 is fixedly connected with the bottom of the testing pool 4; and the four lifting columns 2 penetrate through the four lifting rings 3-7 in a one-to-one correspondence mode; and the self-adaptive clamping equipment 3 moves up and down along the lifting columns 2.

As a preferred mode, the clamping supporting rod 3-5 is connected into a hydraulic control system, the clamping supporting rod 3-5 can be controlled by the hydraulic control system to extend, and certain clamping force is provided to prevent falling. The whole self-adaptive clamping equipment 3 fixes the horizontal position and the vertical translation amount through the lifting rings 3-7 at the four corners of the supporting table 3-1, and automatic lifting of the platform is achieved.

The specific working principle of the self-adaptive clamping equipment 3 is as follows: firstly, according to the axial size of the galvanic pile 13, the radial size of installation, namely the total length of the supporting table 3-1 and two display boards 3-2, is roughly determined, the elongation degree of the display boards 3-2 is determined, the positions of the display boards 3-2 are fixed, and the height adjustment supporting rod 3-3 is adjusted, so that the axis of the clamping supporting rod 3-5 and the axis of the galvanic pile 13 coincide and are fixed through the height locking device 3-4. The hydraulic system controls the clamping supporting rod 3-5 in four directions to extend to clamp the galvanic pile 13 and provides enough clamping force for the clamping plate. If interference occurs on water inlets and water outlets in the two sides, the height adjustment supporting rod 3-3 can be adjusted for secondary positioning. When the sealing performance is tested, the whole galvanic pile 13 needs to be immersed below the liquid level, and the lifting rings 3-7 drive the whole self-adaptive clamping equipment 3 and the galvanic pile 13 to vertically descend to the bottom of the testing tool 4 under the control of the lifting console 1.

Figure 3:
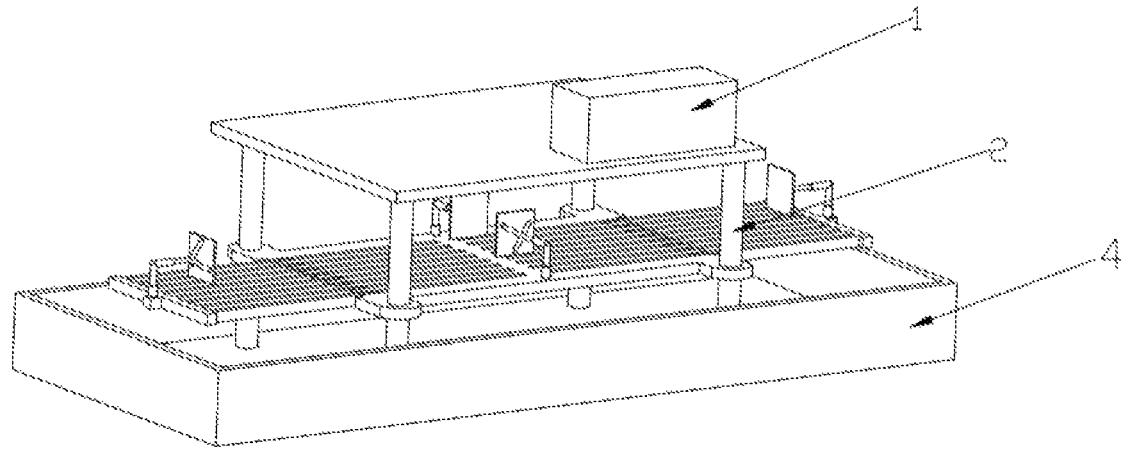
FIG. 3 is a structural schematic diagram of a lifting console provided by the embodiment of the present disclosure.

The self-adaptive clamping equipment 3 and the lifting console 1 are assembled and matched as shown in FIG. 3. In FIG. 3, the lifting columns 2 are welded to the bottom of the testing pool 4, and the self-adaptive clamping equipment 3 can be driven to move up and down. When the galvanic pile 13 is installed, the lifting console 1 controls the self-adaptive clamping equipment 3 to fall to the bottom of the testing pool 4. After the galvanic pile 13 is installed, the discharge performance is tested. When a sealing performance leakage test is carried out, the self-adaptive clamping equipment 3 and the galvanic pile 13 to be tested need to be lifted, and a water leakage detection instrument (water leakage detection test paper) placed at the bottom is used for detecting whether a leakage phenomenon exists or not; and when a permeation experiment is carried out, the clamping equipment and the galvanic pile 13 (galvanic pile to be tested) fall to the bottom, and water starts to enter the testing pool 4 until the liquid level is submerged over the top of the shell of the galvanic pile 13. According to the test paper, litmus paper is adopted as the test paper for the leakage test, the electrolyte of the metal fuel cell is filled with alkaline substances after reaction. For example, magnesium hydroxide in a magnesium fuel cell reaction product is alkaline, and red litmus paper turns blue when encountering the alkaline substances. Therefore, whether an electrolyte leakage phenomenon occurs on the galvanic pile 13 or not can be detected by observing whether the color of the litmus paper is changed or not.

Exemplarily, the sealing performance testing equipment comprises a distilled water tank 9, a distilled water pipe 6, a water pump 7, an electronic scale 5 and a water leakage detection instrument. As shown in FIG. 1, the distilled water tank 9 is connected with the testing pool 4 through the distilled water pipe 6, and the water pump 7 is arranged on the distilled water pipe 6. The distilled water tank 9 is used for providing distilled water required by a sealing performance test permeation experiment for the testing pool 4 through the distilled water pipe 6 and the water pump 7. The electronic scale 5 is arranged below the testing pool 4 and used for measuring the mass of the galvanic pile 13 before and after reaction operation in a sealing performance test leakage experiment, so that the water leakage amount of the galvanic pile 13 is obtained. The water leakage detection instrument is placed at the bottom of the testing pool 4 during the sealing performance test leakage experiment to detect whether a leakage phenomenon of the galvanic pile 13 exists or not.

The computation of the water leakage amount is as follows.

The initial mass of the galvanic pile to be detected at the beginning of measurement during stable operation is set to be $m_0$. After the value changes of the electric parameters in the duration of $T_1$ are recorded, the ending mass $m_1$ is measured, so that the mass $m_l$ of leaked liquid during operation in the duration is as follows.

$$m_l = m_0 - m_1$$

The evaporation capacity of the leaked liquid is small, and the leaked liquid is ignored during calculation. The volume $V_l$ of the leaked liquid at the beginning of computation is as follows.

$$V_1 = \frac{m_1}{\rho_s}$$

The leakage amount $V_t$ during the operation of the galvanic pile in unit time is calculated as follows.

$$V_t = \frac{V_1}{T_1}$$

The leakage amount $V_t$ of the galvanic pile in unit time is substituted into an evaluation system as a test index.

The calculation formula of the water leakage mount of the galvanic pile is as follows.

$$V_t = \frac{V_l}{T_1} = \frac{m_l}{\rho_s} \cdot \frac{1}{T_1} = \frac{m_0 - m_1}{\rho_s} \cdot \frac{1}{T_1} \qquad (60)$$

The performance testing device further comprises a test platform 8. The test platform 8 is divided into three layers including a top layer, a middle layer and a bottom layer. The top layer is used for placing the electronic scale 5. The middle layer is used for placing the distilled water tank 9.

The bottom layer is used for placing an electrolyte circulating system and accessory equipment of the metal fuel cell.

As shown in FIG. 1, the test platform 8 is divided into three layers, main equipment for testing discharge performance and sealing performance is placed on the top layer, and the lifting console 1 controls the self-adaptive clamping equipment 3 and the galvanic pile 13 to be tested to move up and down along the lifting columns 2, so that different test requirements are met. The galvanic pile 13 to be tested is installed in the self-adaptive clamping equipment 3, cathode and anode binding posts are connected with the electric test equipment 10, various electrical index values can be observed in real time, and the measured values are used for evaluation of the discharge performance test. The testing pool 4 is used for examining the gas tightness of the shell of the galvanic pile 13 in the sealing performance test permeation experiment. The electronic scale 5 measures the overall mass of the clamping equipment, the water leakage amount of the galvanic pile 13 is calculated according to mass changes before and after reaction operation, the accuracy is accurate to gram, and the measured values are used for leakage experiment evaluation. The distilled water tank 9 is arranged on the second layer and provides distilled water required by the sealing performance test permeation experiment as an auxiliary medium. The distilled water pipe 6 is connected with the testing pool 4, and the water pump 7 provides power for conveying distilled water. The bottom layer 8 is used for placing an electrolyte circulating system and other possible accessory equipment of the metal fuel cell.

Figure 4:
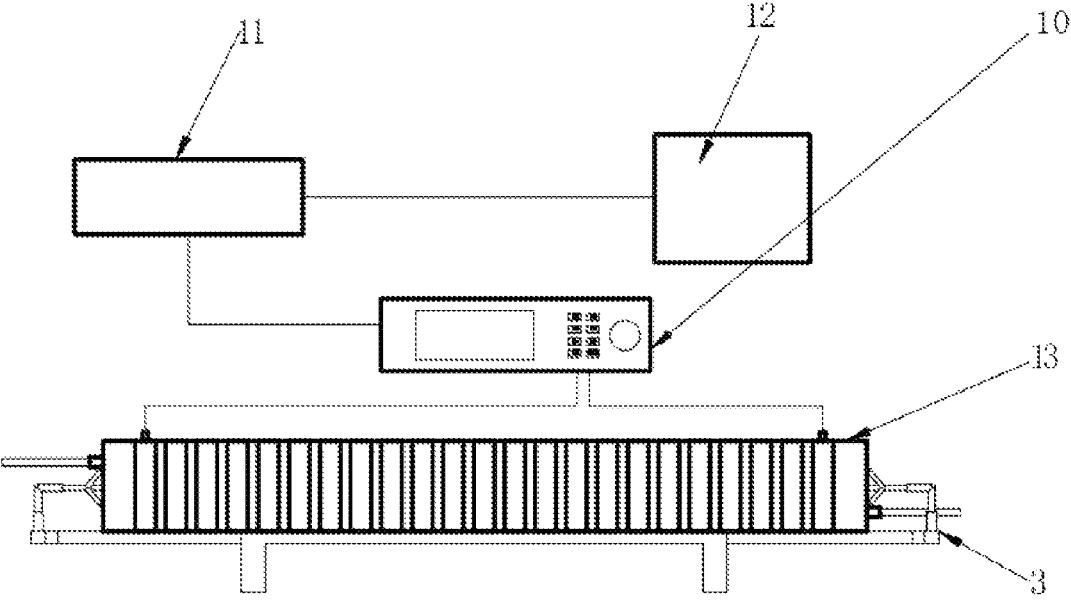
FIG. 4 is a wiring diagram of discharge performance testing equipment provided by the embodiment of the present disclosure.

In an example, referring to FIG. 4, the discharge performance testing equipment comprises electric test equipment 10, a data acquisition instrument 11 and a computer 12. Cathode and anode binding posts of the galvanic pile 13 are connected to the anode and the cathode of the electric test equipment 10. The signal output end of the electric test equipment 10 is connected with the signal input end of the data acquisition instrument 11, and the signal output end of the data acquisition instrument 11 is connected with the computer 12. The electric test equipment 10 is used for acquiring electric parameter data of the galvanic pile 13 and transmitting the electric parameter data to the data acquisition instrument 11. The data acquisition instrument 11 is used for forming a time domain data set file from the acquired electric parameter data and transmitting the time domain data set file to the computer 12. The computer 12 is used for analyzing and calculating the electric parameter data in the time domain data set file to complete a discharge performance test.

The index calculation of the discharge performance is as follows.

The recorded real-time power of the galvanic pile is set to be $W_t$, and the stable operation testing duration of the galvanic pile is recorded to be $T_2$, so that the average stable operation power is $W_e$.

$$W_e = \frac{\sum w_t}{T_2}$$

The maximum power difference $W_\Delta$ is calculated.

$$W_\Delta = |W_e - (W_t)_{max}|$$

The maximum power difference $W_\Delta$ and the average stable operation power $W_e$ are taken as the test indexes of discharge performance evaluation.

The performance testing device applicable to a metal fuel cell is designed by comprehensively considering the test of two core performance of the metal fuel cell and improving and innovating testing and clamping equipment. Specifically, a device suitable for testing the sealing performance and the discharge performance of the metal fuel cell is matched with the test indexes of the two performances. The testing device meets the compatibility requirement of large-batch and multi-type cells delivered from a factory, the sealing test and the discharging test are synchronously carried out, the non-consistency of the cell test can be eliminated to the maximum extent, and the timeliness and accuracy of the cell test are met. The device can realize perfusion of different electrolytes and measurement of different numbers of metal fuel single cells with different sizes, and is applicable to examination and testing of all current metal fuel cell manufacturers when the cells leave the factory.

The standardization and standardization of factory examination of the metal fuel cell are promoted, all-dimensional and multi-angle development of the metal fuel cell industry can be promoted, and the metal fuel cell can give full play to huge market application prospects and development potentials and can be widely applied to various new energy industry chains.

All embodiments in this specification are described in a progressive manner. Each embodiment focuses on differences from other embodiments. For the part that is the same or similar between different embodiments, reference may be made between the embodiments.

Several examples are used for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A performance testing device applicable to a metal fuel cell, wherein the performance testing device comprises self-adaptive clamping equipment, a lifting console, a testing pool, sealing performance testing equipment and discharge performance testing equipment, wherein the self-adaptive clamping equipment is arranged in the testing pool; the self-adaptive clamping equipment is configured to autonomously position and clamp galvanic piles with different sizes and shapes;

the lifting console is connected with the self-adaptive clamping equipment, and the lifting console is configured to control the self-adaptive clamping equipment to ascend and descend and regulate and control the height from the self-adaptive clamping equipment to the bottom of the testing pool;

the sealing performance testing equipment is connected with the testing pool and configured to test the sealing performance of the metal fuel cell through the testing pool; and the discharge performance testing equipment is connected with the metal fuel cell in the self-adaptive clamping equipment and configured to test the discharge performance of the metal fuel cell.

2. The performance testing device applicable to a metal fuel cell according to claim 1, wherein the self-adaptive clamping equipment comprises a supporting table, two display boards, four clamping structures and four lifting rings;

the two display boards are both in comb shapes, the two opposite sides of the supporting table are in comb shapes matched with the display boards, and each display board is telescopically connected with one side of the supporting table; when the two display boards are not unfolded, the two display boards and the supporting platform form a complete flat board; the two display boards are unfolded at corresponding lengths according to the size of a galvanic pile, and gaps between combs of the display boards are configured to enable an electrolyte leaked from the galvanic pile to flow down and be collected in the testing pool;

the two clamping structures are oppositely arranged on the two display boards, the other two clamping structures are oppositely arranged on the supporting table, and the connecting line of the two clamping structures is vertical to the connecting line of the other two clamping structures; the four clamping structures are configured to autonomously position and clamping-galvanic piles with different sizes and shapes;

the four lifting rings are fixedly connected with the supporting table, and the control ends of the four lifting rings are connected with the lifting console; and the four lifting rings are configured to drive the supporting table and the galvanic pile to ascend and descend under the control of the lifting console and regulate and control the height from the galvanic pile to the bottom of the testing pool.

3. The performance testing device applicable to a metal fuel cell according to claim 2, wherein the clamping structures comprise a height adjustment supporting rod, a height locking device, a clamping supporting rod, a spherical hinge connecting device and a self-adaptive claw plate;

one end of the height adjustment supporting rod is connected with the height locking device, and the other end of the height adjustment supporting rod is vertically connected with one end of the clamping supporting rod; the height locking device is fixed on the display boards or the supporting table; the other end of the clamping supporting rod is connected with the self-adaptive claw plate through the spherical hinge connecting device; the self-adaptive claw plate can rotate by 120° around the spherical hinge connecting device;

the height adjustment supporting rod is configured to adjust the vertical height, so that the axis of the clamping supporting rod coincides with the axis of the galvanic pile and is fixed through the height locking device; and the clamping supporting rod is configured to adjust the horizontal elongation degree, and the galvanic pile is clamped through the self-adaptive claw plate.

4. The performance testing device applicable to a metal fuel cell according to claim 3, wherein the self-adaptive claw plate comprises a three-way rod and a connecting flat plate; and one end of the three-way rod is connected with the same side face of the connecting flat plate, and the other end of the three-way rod is connected with the spherical hinge connecting device.

5. The performance testing device applicable to a metal fuel cell according to claim 2, wherein the performance testing device further comprises four lifting columns;

one end of each of the four lifting columns is fixedly connected with the bottom of the testing pool; the four lifting columns penetrate through the four lifting rings in a one-to-one correspondence mode; and the self-adaptive clamping equipment moves up and down along the lifting columns.

6. The performance testing device applicable to a metal fuel cell according to claim 1, wherein the sealing performance testing equipment comprises a distilled water tank, a distilled water pipe, a water pump, an electronic scale and a water leakage detection instrument;

the distilled water tank is connected with the testing pool through the distilled water pipe, and the water pump is arranged on the distilled water pipe; the distilled water tank is configured to provide distilled water required by a sealing performance test permeation experiment for the testing pool through the distilled water pipe and the water pump;

the electronic scale is arranged below the testing pool and configured to measure the mass of the galvanic pile before and after reaction operation in a sealing performance test leakage experiment, so that the water leakage amount of the galvanic pile is obtained; and the water leakage detection instrument is placed at the bottom of the testing pool during the sealing performance test leakage experiment to detect whether a leakage phenomenon of the galvanic pile exists or not.

7. The performance testing device applicable to a metal fuel cell according to claim 6, wherein the calculation formula of the water leakage amount of the galvanic pile is shown as follows:

$$V_t = \frac{V_l}{T_1} = \frac{m_l}{\rho_s} \cdot \frac{1}{T_1} = \frac{m_0 - m_1}{\rho_s} \cdot \frac{1}{T_1}; \text{ and}$$

in the formula, $V_t$ is the leakage amount during the operation of the galvanic pile in unit time, $V_l$ is the volume of leaked liquid in the duration of $T_1$, $m_l$ is the mass of leaked liquid during operation in the duration of $T_1$, $\rho_s$ is the density of the leaked liquid, $m_0$ is the initial mass at the beginning of measurement during stable operation of the galvanic pile, and $m_1$ is the mass at the end of measurement.

8. The performance testing device applicable to a metal fuel cell according to claim 6, wherein the performance testing device further comprises a test platform;

the test platform is divided into three layers including a top layer, a middle layer and a bottom layer; the top layer is configured to place the electronic scale; the middle layer is configured to place the distilled water tank; and the bottom layer is configured to place an electrolyte circulating system and accessory equipment of the metal fuel cell.

9. The performance testing device applicable to a metal fuel cell according to claim 1, wherein the discharge performance testing equipment comprises electric test equipment, a data acquisition instrument and a computer;

cathode and anode binding posts of the galvanic pile are connected to the anode and the cathode of the electric test equipment;

the signal output end of the electric test equipment is connected with the signal input end of the data acquisition instrument, and the signal output end of the data acquisition instrument is connected with the computer;

the electric test equipment is configured to acquire electric parameter data of the galvanic pile and transmit the electric parameter data to the data acquisition instrument;

the data acquisition instrument is configured to form a time domain data set file from the acquired electric parameter data and transmit the time domain data set file to the computer; and the computer is configured to analyze and calculate the electric parameter data in the time domain data set file to complete a discharge performance test.

10. The performance testing device applicable to a metal fuel cell according to claim 9, wherein the test indexes of discharge performance evaluation comprise average stable operation power $W_e$ and maximum power difference $W_\Delta$;

$$W_e \text{ is } W_e = \frac{\sum w_t}{T_2};$$

the calculation formula of the average stable operation power in the formula, $W_t$ is the real-time power of the galvanic pile, and $T_2$ is the stable operation testing duration of the galvanic pile;

the calculation formula of the maximum power difference $W_\Delta$ is $W_\Delta = |W_e - (W_t)_{max}|$; and in the formula, $(W_t)_{max}$ is the maximum value of the real-time power of the galvanic pile.

* * * * *